United States Patent
Kirby et al.

(10) Patent No.: US 11,741,472 B2
(45) Date of Patent: *Aug. 29, 2023

(54) SYSTEMS AND METHODS FOR USE IN AUTHENTICATING USERS TO ACCOUNTS IN CONNECTION WITH NETWORK TRANSACTIONS

(71) Applicant: MASTERCARD INTERNATIONAL INCORPORATED, Purchase, NY (US)

(72) Inventors: Aaron Kirby, Chesterfield, MO (US); Brandon Craig Bryson, Wildwood, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/537,330

(22) Filed: Nov. 29, 2021

(65) Prior Publication Data

US 2022/0108317 A1    Apr. 7, 2022

Related U.S. Application Data

(63) Continuation of application No. 15/850,216, filed on Dec. 21, 2017, now Pat. No. 11,188,912.

(51) Int. Cl.
*G06Q 20/40*  (2012.01)
*G06Q 30/0601*  (2023.01)
*G06Q 20/12*  (2012.01)

(52) U.S. Cl.
CPC ......... *G06Q 20/4014* (2013.01); *G06Q 20/12* (2013.01); *G06Q 30/0601* (2013.01)

(58) Field of Classification Search
CPC .............. G06Q 20/4014; G06Q 20/12; G06Q 30/0601; G06Q 20/405

(Continued)

(56) References Cited

U.S. PATENT DOCUMENTS 8,660,955 B2   2/2014 Ledbetter et al.
2005/0240522 A1*  10/2005 Kranzley ............. G06Q 20/102
                                                    705/40

(Continued)

FOREIGN PATENT DOCUMENTS

CN        105814592 A      7/2016
KR    20170121014 A     11/2017

(Continued)

OTHER PUBLICATIONS

A critical analysis of buyer authenticated credit card payment programs: the online merchant's perspective. Ally, Mustafa and Toleman, Mark. e-Biz World Conference 2004. Seoul, Korea. (Year: 2004) (Year: 2004).*

(Continued)

*Primary Examiner* — Bruce I Ebersman
*Assistant Examiner* — John O Preston
(74) *Attorney, Agent, or Firm* — Harness, Dickey & Pierce, P.L.C.

(57) ABSTRACT

Systems and methods are provided for authenticating users to accounts in connection with network transactions. An exemplary method includes receiving an authentication request associated with a transaction where the authentication request includes a credential associated with the account, and transmitting an authentication assertion request to an entity associated with the account other than an access control server (ACS) associated with an issuer of the account. The method also includes providing an authentication confirmation, in response to the authentication request, when the entity provides an authentication assertion for the transaction based on a prior authentication of the user, whereby the transaction proceeds based on the authentication confirmation and without authentication specific to the transaction. The method further includes seeking authenti- (Continued)

cation of the user, based on the authentication request, from the ACS, when the entity provides instruction to seek authentication of the user or fails to respond to the authentication assertion request.

19 Claims, 3 Drawing Sheets

(58) Field of Classification Search
USPC .......................................................... 705/44
See application file for complete search history.

(56) References Cited

U.S. PATENT DOCUMENTS

| | | | |
|---|---|---|---|
| 2008/0120214 A1* | 5/2008 | Steele | G07F 7/1008 |
| | | | 705/35 |
| 2009/0164354 A1 | 6/2009 | Ledbetter et al. | |
| 2015/0039506 A1 | 2/2015 | Groarke et al. | |
| 2015/0161608 A1 | 6/2015 | Gilbert et al. | |
| 2017/0046701 A1 | 2/2017 | Hey et al. | |
| 2017/0262850 A1* | 9/2017 | Hammad | G06Q 20/4016 |
| 2019/0197542 A1 | 6/2019 | Kirby et al. | |

FOREIGN PATENT DOCUMENTS

| | | |
|---|---|---|
| KR | 20170122890 A | 11/2017 |
| RU | 2491733 C2 | 8/2013 |

OTHER PUBLICATIONS

A PKI enabled authentication protocol for secure e-payment framework. Islam, Mridha, and Rahman. Department of Information and Communication Technology, Bangladesh University of Professionals, Department of Computer Science and Engineering, University of Asia Pacific. (Year: 2017).*

Negotiating Trust on the Web. Winslett, Yu, et al. IEEE Internet Computing. (Year: 2002).*

"A critical analysis of buyer authenticated credit card payment programs: the online merchant's perspective". Ally, Mustafa and Toleman, Mark, e-Biz World conference, Seoul, Korea (Year: 2004); 8 pgs.

"A PKI enabled authentication protocol for secure e-payment framework". Islam, Mridha and Rahman. Department of Information and Communication Technology, Bangladesh University of Professional, Department of Computer Science and Engineering, University of Asia Pacific. (Year: 2017); 9 pgs.

Negotiating Trust on the Web. Winslett, Yu et al. IEEE Internet Computing (Year: 2002); 8 pgs.

* cited by examiner

SYSTEMS AND METHODS FOR USE IN AUTHENTICATING USERS TO ACCOUNTS IN CONNECTION WITH NETWORK TRANSACTIONS

CROSS-REFERENCE TO RELATED APPLICATION

This application is a continuation of U.S. patent application Ser. No. 15/850,216 filed on Dec. 21, 2017. The entire disclosure of the above application is incorporated herein by reference.

FIELD

The present disclosure generally relates to systems and methods for use in authenticating users to accounts in connection with network transactions and, in particular, to systems and methods in which authentication of users in prior transactions (or other prior interactions with providers of the accounts) may be used to provide authentication for the users in connection with subsequent transactions.

BACKGROUND

This section provides background information related to the present disclosure which is not necessarily prior art.

Network transactions often involve users, who initiate the transactions. To ensure the propriety of users involved in the transactions, typically, the users are authenticated for the transactions. In connection with payment account transactions, specifically, certain entities (e.g., banking institutions, etc.) rely on authentication services to authenticate the users, such as, for example, the 3-D Secure™ protocol, which relies on merchant server plug-ins, or MPIs, at merchants involved in the transactions, and access control servers, or ACSs, associated with issuers of payment accounts used in the transactions. The 3-D Secure™ protocol is known to be employed for online transactions to permit cardholders to be authenticated when they are not physically present at the merchants when performing the transactions (i.e., for card-not-present transactions).

In connection therewith, for a card-not-present transaction initiated by a consumer at a merchant, an authentication request is provided from an MPI associated with the merchant to a directory server (e.g., associated with a payment network, etc.). In turn, the directory server directs the authentication request to an ACS associated with an issuer of a payment account used in the transaction (e.g., a bank, etc.). The ACS communicates with the consumer, for example, via a smartphone, to request a personal identification number (PIN), a biometric, a password, and/or a one-time passcode for authentication of the consumer. When authenticated, a confirmation reply is passed back to the MPI and the directory server. Then, the reply is compiled into an authorization request for the transaction, which is transmitted from the merchant, to an acquirer associated with the merchant, and to the issuer (via the payment network) for approval by the issuer, as is conventional. An exemplary implementation of the 3-D Secure™ protocol includes the SecureCode™ service by MasterCard®.

Separately, it is known for issuers or other entities to provide network-based applications to users, whereby the users are provided with access to their accounts through the applications (typically via computing devices), for example, after being authenticated. The users may be authenticated through use of biometrics or other information unique to and/or known to the users, etc.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Payment accounts are widely used by users to fund transactions for products (e.g., for good, services, etc.) at merchants. To avoid issues related to fraudulent or other unauthorized transactions, in part, issuers associated with the payment accounts and/or payment networks associated with processing the transactions impose certain authentication techniques to ensure the users are authorized to initiate transactions to the payment accounts (e.g., via the 3-D Secure™ protocol, etc.). Such authentication techniques typically involve authentication of the users, for example, via personal identification numbers (PINs), comparison of biometrics, confirmation of passwords, and/or confirmation of one-time passcodes, etc. Separately, issuers, governments, or other entities may provide services to the users of the payment accounts in the form of applications, websites, etc. (broadly, network-based applications), whereby the users are permitted to access account details for their accounts, alter account settings, apply for accounts, etc. through the applications, websites, etc., after being authenticated.

Uniquely, the systems and methods herein leverage prior authentications of users (e.g., via network-based applications such as virtual wallets, etc.) to provide an enhanced authentication of the same users in connection with the prior authentications and/or for certain transactions (e.g., card-not-present transactions, etc.) initiated by the users. In particular herein, when a user interacts with one or more applications, websites, etc., offered by or on behalf of an account issuer, a government, or other entity in connection with accessing a payment account associated with the user, the user may be required to be authenticated prior to accessing account details for the payment account, or otherwise using the applications, websites, etc. The authentication may be, for example, a biometric authentication, or other authentication as described herein. Within moments, or later, or within another interval of completing such authentication, the consumer may initiate a transaction with a merchant to be funded by the payment account (where the payment account is also enrolled in enhanced authentication). In response, a merchant server plug-in (MPI) associated with the merchant initially seeks authentication of the user through a directory server. In response, rather than routing the authentication request to an access control server (ACS) associated with the issuer of the payment account, the directory server recognizes the prior authentication and transmits an authentication assessment request directly to the issuer, government or other entity associated with the payment account. Depending on the last prior or recent authentication of the user, at the applications, websites, etc., by or on behalf of the issuer (or government or other entity), the issuer (or government or other entity) may confirm the authentication to the directory server, thereby permitting the transaction to avoid duplicate authentication with the ACS. In this manner, the directory server cooperates directly with the issuer to leverage a prior authentication of the user (potentially involving the ACS) to avoid a duplicate authentication of the user in the subsequent transaction. As such, a more efficient and more timely authentication process is provided, which deviates from conventional authentication (including conventional authentication via the 3-D Secure™ protocol) and reduces inconvenience and/or interruption of purchase experiences of users. What's more, this may be done while preserving personal identifying information for the user, for example, without the issuer and/or ACS revealing any user-specific information to the directory server, associated payment network, etc.

Figure 1:
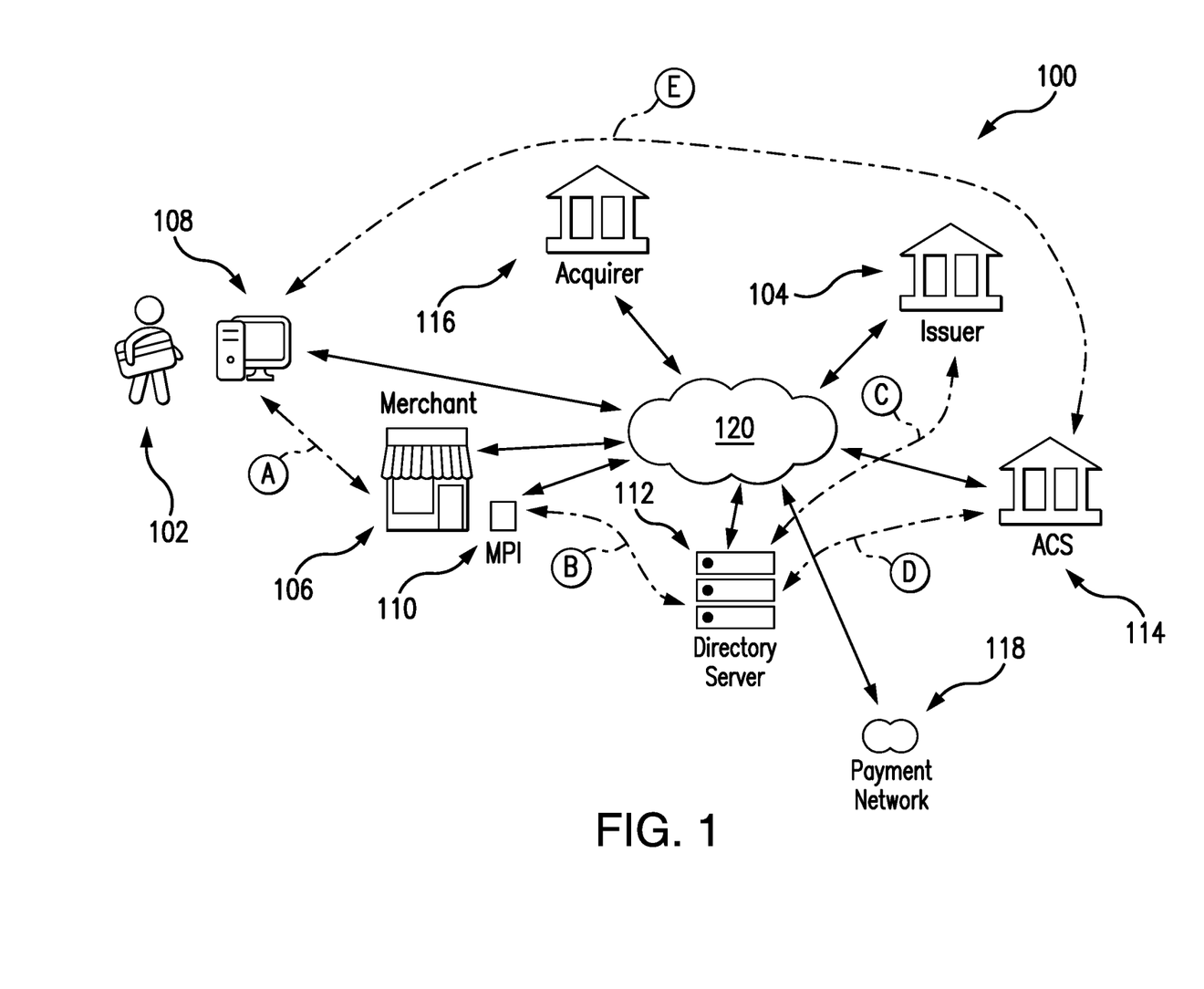
FIG. 1 illustrates an exemplary system for use in authenticating users to accounts in connection with network transactions, and including one or more aspects of the present disclosure.

FIG. 1 illustrates an exemplary system 100 for implementing a process that may be utilized for enhanced authentication of a consumer 102 (broadly, a user) in connection with a transaction by the consumer 102, and which is consistent with the 3-D Secure™ protocol, for example. It should be appreciated, however, that not all details of the 3-D Secure™ protocol are discussed herein, since a complete detailed disclosure of such information may be readily understood by generally referencing the 3-D Secure™ protocol. In addition, the illustrated system 100 includes a plurality of entities that interact with each other by exchanging multiple, specifically formatted messages over secure communication channels (e.g., as defined in the 3-D Secure™ protocol, etc.).

In the illustrated embodiment, the consumer 102 is associated with a payment account. The payment account is issued to the consumer 102 by an issuer 104 and is useable by the consumer 102 to fund purchase transactions with one or more merchants (e.g., merchant 106, etc.). The consumer 102 is also associated with a computing device 108. The computing device 108 may include, for example, a tablet, a smartphone, a laptop, a desktop, or other device, which enables the consumer 102 to interact and/or communicate with the one or more merchants, including the merchant 106 (e.g., via websites and/or network-based applications provided by the merchant 106, etc.). Details of the computing device 108 and other computing devices identified herein (e.g., servers, etc.) are described more fully below, with reference to FIG. 2. While only one computing device 108 is illustrated, it should be understood that the consumer 102 may be associated with multiple such computing devices including, for example, the computing device 108, a smartphone, a tablet, a laptop computer, etc.

With continued reference to FIG. 1, the merchant 106 includes a virtual merchant having a virtual merchant location, such as, for example, a website, an application, or other network-based applications, etc., which is/are accessible by the consumer 102, via the computing device 108. The merchant's virtual location may be managed and/or provided directly by the merchant 106, or it may be hosted and/or provided by one or more other entities on behalf of the merchant 106, etc.

In general in the system 100, when the consumer 102 interacts with the virtual location of the merchant 106, via the computing device 108 as indicated by path A in FIG. 1, the consumer 102 may be able to browse different products (e.g., goods, services, etc.) offered for sale by the merchant 106 and to select to purchase one or more of the products (e.g., in connection with a card-not-present transaction, etc.). In connection therewith, the consumer 102 may select an input to checkout at the merchant's virtual location, once the desired product(s) is/are selected. In response to the input to checkout, the merchant 106, generally, is configured to collect necessary and/or desired information, such as, for example, the consumer's name, billing address, shipping address, payment account credentials for his/her payment account, etc., or to retrieve the same, in whole or in part, from a profile associated with the consumer 102 (based on prior interaction(s) between the consumer 102 and the merchant 106).

In turn, the merchant 106 passes the information collected for the consumer 102 to a merchant server plug-in (MPI) 110 associated with the merchant 106, to initially authenticate the consumer 102. The MPI 110 generally includes a software module executed at the merchant 106. The MPI 110, in response to receiving the various consumer information from the merchant 106, is configured to compile an authentication request (or verified enrollment request, referred to herein as "VEreq") for the transaction and to transmit the VEreq to a directory server 112, along path B. Upon receiving the VEreq from the MPI 110, the directory server 112 is configured to determine if the consumer's payment account is enrolled for enhanced authentication services, etc. For example, the directory server 112 may be configured to identify a payment account credential included in the VEreq and to determine, based on a range of credentials, or on a range of bank identification numbers (BINs) or primary account numbers (PANs) for the credentials, etc., whether or not the consumer's payment account is enrolled in enhanced authentication services. The directory server 112 is then configured, in this exemplary embodiment, to transmit an authentication assertion request directly to the issuer 104 of the consumer's payment account (as opposed to an access control server (ACS) 114 associated with the issuer 104), when the payment account (and the issuer 104) is/are enrolled in the enhanced authentication service, to determine if the consumer 102 (and/or the consumer's payment account) is associated with any prior successful authentications of which the issuer 104 may be aware (in order to bypass the conventional flow of such authentication to the ACS 114). The authentication assertion request is transmitted, by the directory server 112, along path C in FIG. 1.

Additionally in the system 100, or alternatively, upon receiving the VEreq for the transaction from the MPI 110, the directory server 112 may be configured to determine whether the transaction is a card-not-present type transaction, or other parameters associated with the transaction (e.g., amount, merchant, etc.). The directory server 112 may be configured to then rely on such additional information (and specific conditions being satisfied, or not, by the information) when transmitting, or not transmitting, the authentication assertion request to the issuer 104.

In any case, upon receipt of the authentication assertion request from the directory server 112, the issuer 104 is configured to determine whether the consumer 102 is eligible for authentication assertion, again, based on any prior authentications of which the issuer 104 is aware and/or one or more other parameters (e.g., temporal parameters associated with the prior authentications, identify parameters associated with the individual in the prior authentication, etc.). Specifically, when the consumer 102 has been authenticated to an application associated with the issuer 104 (e.g., a virtual wallet application, etc.), i.e., a prior authentication, the issuer 104 may be configured to confirm the authentication of the consumer 102 (in response to the authentication assertion request from the directory server 112), based on the prior authentication of the consumer 102 to the issuer's application and, potentially, when the prior authentication is within the last ten minutes, fifteen minutes, thirty minutes, one or more less, or more or less (broadly, within a defined interval or duration). What's more, the issuer 104 may be configured to further rely on one or more other conditions of the prior authentication (e.g., form of authentication, strength of authentication, etc.), of the current transaction (e.g., amount of the transaction, etc.), or of the consumer's payment account (e.g., whether suspicious transactions have previously been made to the payment account, etc.), etc., to determine whether the consumer 102 is eligible for authentication assertion. It should be appreciated that the prior authentication may be specific to the consumer's payment account (regardless of whether the prior authentication was for the consumer 102 or for another authorized user of the payment account), or it may be specific to the consumer 102 (e.g., specific to the consumer 102 being authenticated to his/her payment account used in the given transaction (and no one else, even if authorized to use the payment account), or it may relate to the consumer 102 simply being previously authenticated in any manner and/or to any payment account in general and which authentication is known to the issuer 104 and/or the ACS 114 (e.g., depending on the risk model employed by the issuer 104 and/or the ACS 114, etc.). In one example, a prior authentication may include the user successfully accessing (e.g., logging in to, etc.) his/her payment account via a mobile banking application provided by the issuer 104 to check a balance of his/her primary checking account.

Then in the system 100, when the issuer 104 determines that the consumer 102 is eligible for authentication assertion, the issuer 104 is configured to provide a confirmation (or authentication assertion) to the directory server 112 in response to the authentication assertion request, back along path C in FIG. 1. The confirmation may include a variety of information, including, for example, an accountholder authentication value (AAV) for the authentication request. Apart from the consumer 102 being eligible, or not, for the authentication assertion, the issuer 104 may be further configured to directly provide a decline instruction for the underlying transaction to the directory server 112, again along path C, potentially based on the prior authentication (e.g., if the prior authentication is, or appears, fraudulent; etc.) and/or one or more conditions (whereby the decline instruction may then be communicated by the directory server 112 to the merchant 106, via the MPI 110, such that the transaction may be halted and/or terminated).

In response to the confirmation from the issuer 104, the directory server 112 (e.g., an AAV generator (or additional functionality) associated with the directory server 112, etc.) is configured to provide the confirmation (e.g., including the AAV, etc.) to the MPI 110, back along path B (whereby a special AAV is created in the authorization stream so that the issuer 104 is aware that the authentication for the consumer 102 was asserted). Thereafter, the merchant 106, upon receipt of the confirmation from the MPI 110, is configured to compile an authorization message (i.e., an authorization request) for the given transaction (including the AAV or other confirmation received from the issuer 104) and to transmit the authorization message to an acquirer 116 associated with the merchant 106. The acquirer 116, in turn, communicates the authorization message with the issuer 104, through a payment network 118 associated with the consumer's payment account (via the network 120), for authorization of the transaction. The issuer 104 then determines if the consumer's payment account is in good standing and if sufficient credit/funds to complete the transaction is/are associated with the payment account. In addition, the issuer 104 is configured to verify the AAV or other confirmation included in the authorization message (as provided through the directory server 112 and the MPI 110). If the issuer 104 approves/accepts the transaction, another authorization message (i.e., an authorization reply) is provided back to the merchant 106 authorizing the transaction. The transaction is later cleared and settled by and between the merchant 106 and the acquirer 116 (in accordance with a settlement arrangement, etc.), and by and between the acquirer 116 and the issuer 104 (in accordance with another settlement arrangement, etc.).

Conversely, when the issuer 104 does not provide the confirmation (i.e., when the consumer 102 is ineligible for authentication assertion), the directory server 112 is configured to seek authentication of the consumer 102 in a conventional manner (e.g., in accordance with the 3-D Secure™ protocol, etc.) through the ACS 114 associated with the issuer 104 (where the ACS 114 operates on behalf of, or potentially as a proxy for, the issuer 104, assuming the issuer 104 is enrolled in ACS services), along path D in FIG. 1. In connection therewith, the directory server 112 contacts the ACS 114 and the ACS 114 performs the authentication, for example, by initially verifying enrollment of the consumer's payment account and/or the issuer 104 with the ACS 114 (for the desired authentication services) and, when such enrollment is verified, then by authenticating the consumer 102. In connection with the later, the ACS 114 is configured to provide a network address (e.g., URL, etc.) back to the virtual location of the merchant 106, through the directory server 112 and the MPI 110. The merchant 106 then in turn calls the network address. This permits the ACS 114 to interact with the consumer 102, via the consumer's computing device 108, as indicated by path E, in FIG. 1. As part of the interaction, the ACS 114 may solicit a PIN, a biometric, or other information from the consumer 102 suitable to authenticate the consumer 102. Upon consumer authentication, the ACS 114 responds to the MPI 110 with the confirmation (e.g., the AAV, etc.), or the ACS 114 responds to the MPI 110 with another message when the consumer authentication failed. Thereafter, the MPI 110 and merchant 106 continue as described above (e.g., with the authorization message for the transaction, etc.).

While the system 100 includes only one consumer 102, one issuer 104, one merchant 106, one MPI 110, one directory server 112, one ACS 114, one acquirer 116, and one payment network 118, it should be appreciated that a different number of these entities may be included in other system embodiments. In addition, while the description is presented with reference to the issuer 104 herein for ease of reference, it should be appreciated that a government entity, or other entity, may be included in place of the issuer 104 and/or in addition to the issuer 104 (and/or in association with the issuer 104), to operate, at least in part, consistent with the issuer 104. For example, a government entity (not shown) may include a place of the issuer 104 and/or an association with the issuer 104, etc. For instance, in India a citizen's Aadhaar number may be linked to one or more of his/her payment account numbers. As such, authentication of the Indian citizen based on the present disclosure, in connection with a transaction at a merchant (e.g., for a card-not-present transaction, etc.), may use the Indian citizen's payment account number as a basis (or as a link) to see if the Indian citizen has recently been authenticated using his/her Aadhaar number. If so, an assertion confirmation for the Indian citizen may be provided by the issuer 104/government entity to the directory server 112 (as described above). In another example, the government entity may capture an authentication of the consumer 102 and of other users (as prior authentications), and relay that information to the issuer 104, thereby allowing (or relying on) the issuer 104 to respond to the authentication assertion request described above based on the prior authentication(s). In still another example, the government entity may be the recipient of the authentication assertion request from the directory server 112 and may be responsible for responding thereto, in a similar manner to that described above with reference to the issuer 104.

As shown in FIG. 1, the system 100 also includes a network 120. Each of the issuer 104, merchant 106, the consumer's computing device 108, the MPI 110, the directory server 112, the ACS 114, the acquirer 116, and the payment network 118 is coupled and/or in communication with the network 120 to provide communication therebetween. The network 120 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, the network 120 may include multiple different networks, such as a private payment transaction network made accessible by the MPI 110, the directory server 112, and the ACS 114 and, separately, the public Internet, which is accessible as desired to the computing device 108, the issuer 104, and the ACS 114, etc.

In the above description of the system 100, in connection with determining whether the consumer 102 is eligible for authentication assertion or not, the directory server 112 transmits the authentication assertion request to the issuer 104 (whereby the issuer 104 then determines whether the consumer 102 is eligible for authentication assertion or not). Alternatively, the directory server 112 may transmit the authentication assertion request to the ACS 114, where the ACS 114 is configured to then operate as described (e.g., in place of the issuer 104, as a proxy for the issuer 104, etc.) above to determine whether the consumer 102 is eligible for authentication assertion or not. In both cases, the two cycles conventionally performed in authenticating the consumer 102 (e.g., verifying enrollment of the consumer's payment account for enhanced authentication and authenticating the consumer 102, etc.) are combined into a single operation in which the directory server 112 transmits the authentication assertion request to the issuer 104 or to the ACS 114 (where the issuer 104 and/or the ACS 114 responds with a corresponding confirmation, or not, and not just the enrollment result). What's more, in both cases the directory server 112 transmits the authentication assertion request, whereby various prior successful authentications of the consumer 102 and/or the consumer's payment account may be used to subsequently authenticate the consumer 102 in connection with a later transaction. Here, the directory server 112 may leverage the prior successful authentication of the consumer 102 to reduce friction associated with subsequently authenticating the consumer 102 in a later card-not-present transaction, for example.

Figure 2:
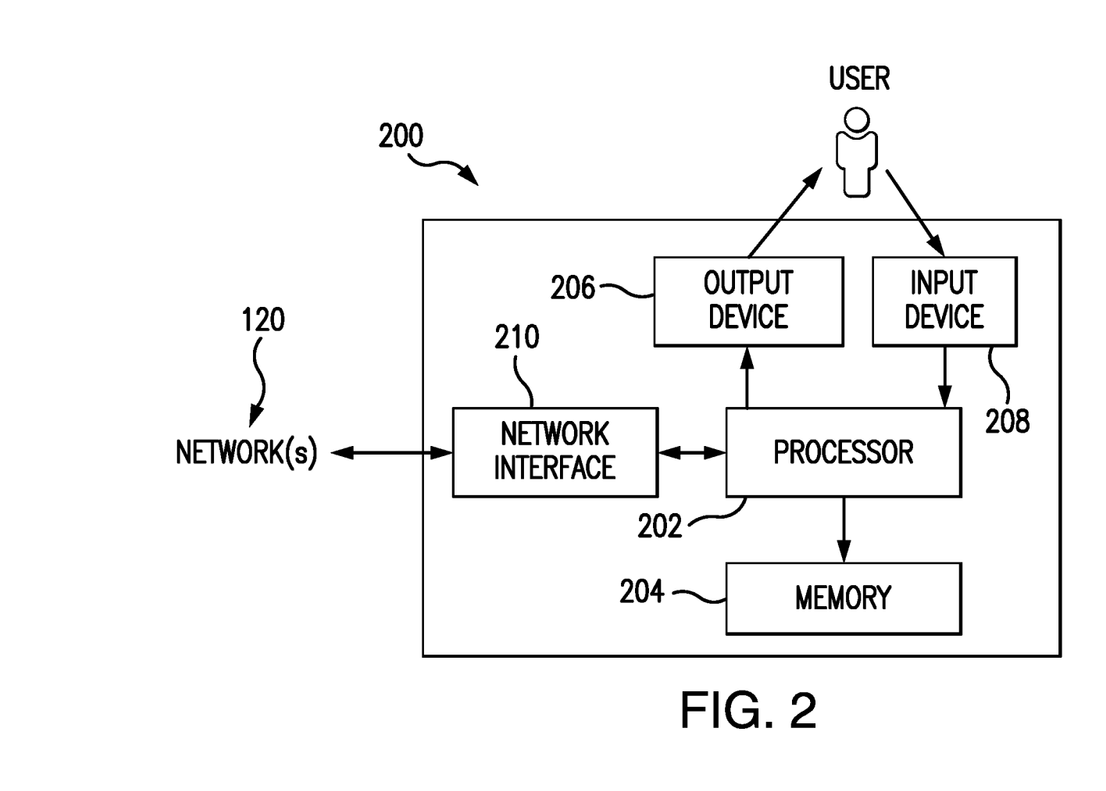
FIG. 2 is a block diagram of an exemplary computing device that may be used in the system of FIG. 1.

FIG. 2 illustrates the exemplary computing device 200, which may include, for example, one or more servers, workstations, personal computers, laptops, tablets, smartphones, other suitable computing devices, etc. In addition, the computing device 200 may include a single computing device, or it may include multiple computing devices located in close proximity, or multiple computing devices distributed over a geographic region, so long as the computing devices are specifically configured to function as described herein. In the system 100, the issuer 104, the merchant 106, the MPI 110, the directory server 112, the ACS 114, the acquirer 116, and the payment network 118 may be understood to be computing devices consistent with, in whole or in part, the computing device 200 (whereby, for example, the processor included in the corresponding computing device 200 is particularly configured, by executable instructions, to operate as described for the given part of the system 100). What's more, the computing device 108 associated with the consumer 102 may be understood to be consistent with the computing device 200. With that said, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, authentication requests, authorization messages, confirmations, AAVs, authentication records, payment account credentials (including PANs, tokens, etc.), and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components configured to perform one or more of the various operations herein. It should be appreciated that the memory 204 may include a variety of different memories, each implemented in one or more of the functions or processes described herein.

In the exemplary embodiment, the computing device 200 also includes an output device 206 that is coupled to (and that is in communication with) the processor 202. The output device 206 outputs information, such as requests for authentication, challenge questions, etc., visually, for example, to a user of the computing device 200 such as the consumer 102, or another user associated with any of the entities illustrated in FIG. 1, etc. The output device 206 may include, without limitation, a liquid crystal display (LCD), a light-emitting diode (LED) display, an organic LED (OLED) display, an "electronic ink" display, speakers, etc. In some embodiments, the output device 206 may include multiple devices.

In addition, the computing device 200 includes an input device 208 that receives inputs from the user (i.e., user inputs) such as, for example, responses to requests for authentication, challenge questions and/or responses thereto, payment account credentials, etc. The input device 208 may include a single input device or multiple input devices. The input device 208 is coupled to (and is in communication with) the processor 202 and may include, for example, one or more of a keyboard, a pointing device, a mouse, a touch sensitive panel (e.g., a touch pad or a touch screen, etc.), another computing device, and/or an audio input device. Further, in various exemplary embodiments, a touch screen, such as that included in a tablet, a smartphone, or similar device, may behave as both the output device 206 and the input device 208.

Further, the illustrated computing device 200 includes a network interface 210 coupled to (and in communication with) the processor 202 and the memory 204. The network interface 210 may include, without limitation, a wired network adapter, a wireless network adapter, a mobile network adapter, or other device capable of communicating to one or more different networks.

Figure 3:
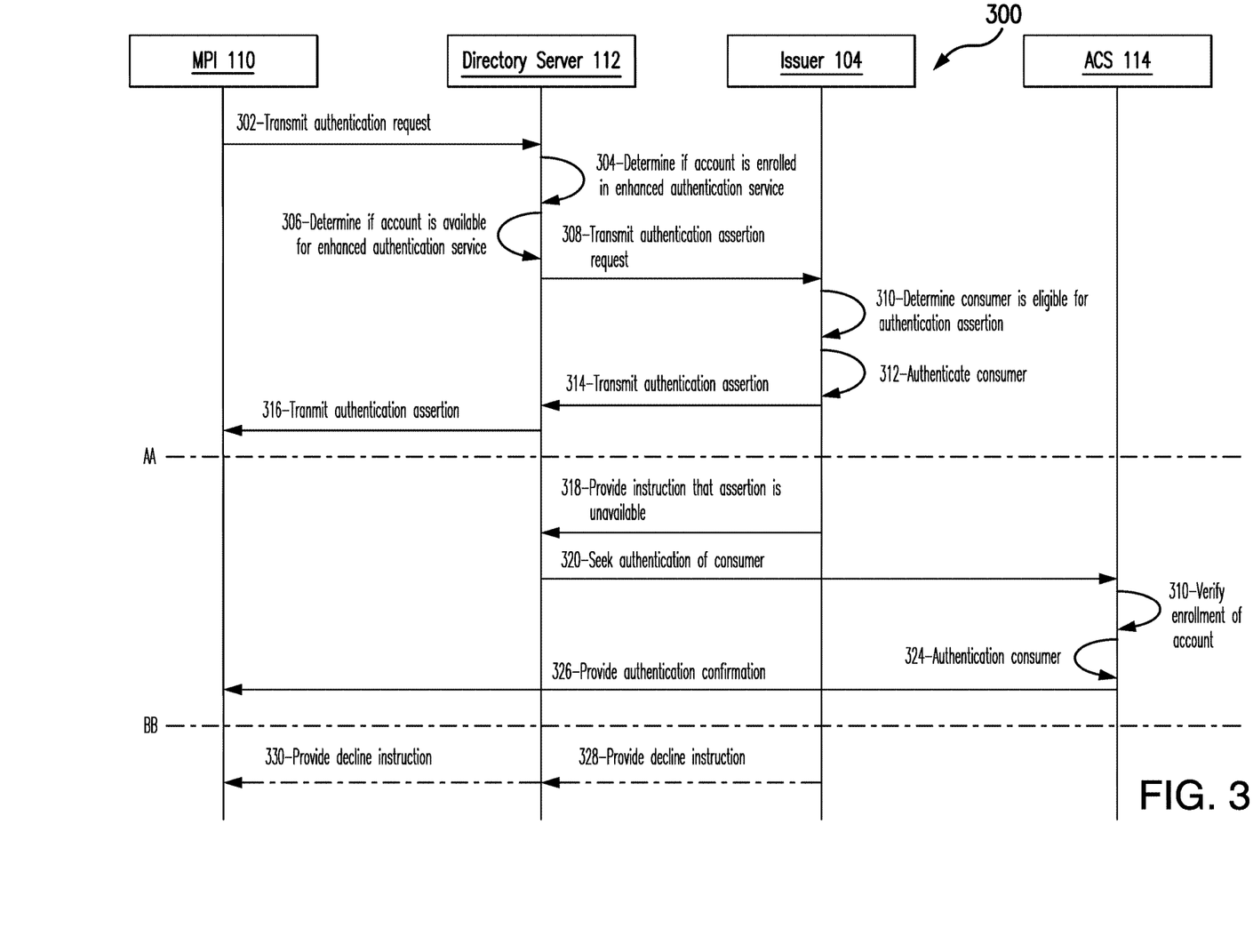
FIG. 3 is an exemplary method for use in authenticating a user to an account in connection with at least one network transaction, and which can be implemented via the system of FIG. 1.

FIG. 3 illustrates an exemplary method 300 for authenticating a user to an account in connection with a network transaction, based on at least a prior authentication of the user and/or the account. The exemplary method 300 is described (with reference to FIG. 1) as generally implemented in the MPI 110, the directory server 112, the issuer 104, and the ACS 114 of the system 100, and with further reference to the computing device 200. As should be appreciated, however, the methods herein should not be understood to be limited to the exemplary system 100 or the exemplary computing device 200, and the systems and the computing devices herein should not be understood to be limited to the exemplary method 300.

In addition in this example, the consumer 102 is associated with a network-based application installed at the computing device 108, where the network-based application is provided by the issuer 104 (or another entity). Specifically, for example, the issuer 104 may provide a financial application (e.g., a mobile banking application, a virtual wallet application, a banking website, etc.), whereby the consumer 102 is required and/or prompted to authenticate himself/herself to the application (e.g., via a fingerprint, a PIN, etc.) each time the application is accessed and/or used (e.g., for accessing account information such as balances, for initiating payment account transactions, etc.). Accordingly, because the financial application is associated with and/or is offered by the issuer 104, the issuer 104 generally knows when the consumer 102 requests access to the application and that the consumer 102 has been authenticated (or not). Also in this example, the consumer 102 has been authenticated to the financial application about four minutes prior to initiation of the exemplary purchase at the merchant 106 described above. In particular, as described above, the consumer 102 is shopping at the virtual location associated with the merchant 106 (e.g., a merchant website, etc.), when the consumer 102 decides to purchase the product(s), where the purchase is to be funded by the consumer's payment account issued by the issuer 104. As such, the consumer 102 requests the purchase at the merchant 106, and provides the payment account credential(s) associated with his/her payment account in the manner described above.

In response to the input by the consumer 102 to purchase the given product(s), at the merchant's virtual location, the merchant 106 provides the payment account credential(s) for the consumer's payment account (e.g., as received from the consumer 102 or via the consumer's virtual wallet application, etc.) and further information associated with the transaction (e.g., a transaction amount, a product description, etc.) to the MPI 110 (as generally described above in the system 100). The MPI 110 then compiles a VEreq for the transaction and transmits the VEreq to the directory server 112, at 302, to determine whether or not the consumer's payment account is enrolled in an enhanced authentication service (e.g., an enhanced authentication service consistent with 3-D Secure™ protocol, etc.) and whether or not the consumer is authenticated. In connection therewith, the VEreq may be cryptographically signed and may include, for example, the information received from the merchant 106 regarding the consumer 102 and/or the underlying transaction (e.g., the payment account credential(s) for the consumer's payment account, such as the account number, etc.; information associated with the transaction, such as the transaction amount, information regarding the merchant 106, etc.; etc.).

In turn in the method 300, the directory server 112 initially determines, at 304, whether the consumer's payment account is enrolled in the enhanced authentication service. Specifically, different issuers may offer different services to consumers, where the services are associated with the accounts issued to the consumers. In order to apply the applicable services, the accounts may be organized into account ranges (e.g., by BIN or PAN, etc.), where certain account ranges are enrolled in certain services. Here, the issuer 104 has assigned an account number to the consumer 102 for his/her payment account, which is within a range associated with the enhanced authentication service. As such, in this example, the directory server 112 determines that the BIN associated with the consumer's payment account is enrolled in the enhanced authentication service, based on the account range within which the BIN for the consumer's payment account is included.

Thereafter, when the account is enrolled for the enhanced authentication service, the directory server 112 determines, at 306, whether the consumer 102 and/or the consumer's payment account is available for enhanced authentication as described herein. In connection therewith, the directory server 112 transmits, at 308, an authentication assertion request to the issuer 104. The authentication assertion request may include, for example, the VEreq and its associated content, in whole or in part, along with additional information, or not. Upon receipt, the issuer 104 determines, at 310, whether the consumer 102 is eligible for authentication assertion based on, at least in part, a prior authentication of the consumer 102 occurring within a defined interval of the current time (as generally described herein). The defined interval may be five minutes, fifteen minutes, twenty minutes, thirty minutes, an hour, or more or less, etc.

In this example, the defined interval is fifteen minutes. As such, taking into account that the consumer 102 has previously been authenticated by the issuer 104, about four minutes prior to initiating the current transaction, in connection with the consumer 102 accessing the financial application provided by the issuer 104 and installed at the consumer's computing device 108, the issuer 104 determines that the consumer 102 is eligible for the authentication assertion because the prior authentication, about four minutes before the instant transaction, is within the fifteen-minute defined interval.

Other parameters and/or conditions, which may be employed by the issuer 104 to determine eligibility of the consumer 102 for the authentication assertion, may include, for example, strength and/or type of the prior authentication (e.g., biometric authentication, one-time passcode authentication, password authentication, PIN authentication, etc.) (as provided in general order of strength), an amount of the transaction, the merchant 106 involved in the transaction, prior suspicious transactions to the consumer's account, etc. In general, for example, combinations of the above may be utilized to vary the requirements for authentication between issuers. For example, one issue may require biometric authentication within the last day. While others may require password or passcode authentication within the last two or three days. And still other issuers may require a biometric within three days or passwords within six hours. It should be appreciated that the determination of eligibility of the consumer 102 for an authentication assertion may be based on any suitable parameter(s) or condition(s) associated with the transaction, the prior authentication, the account, etc.

When the issuer 104 determines that the consumer 102 is eligible for the authentication assertion, the issuer 104 authenticates the consumer 102, at 312, and provides the authentication assertion (or confirmation), at 314, to the directory server 112. The authentication assertion will include information that is specific to the transaction, but devoid of personal identifying information related to the consumer 102. Here, the authentication assertion is provided as an AAV (which is an encrypted value that the directory server 112 cannot decrypt or interpret), but may include other information or codes, etc., in other embodiments. In turn, the directory server 112 provides an authentication confirmation back to the MPI 110, at 316. The authentication confirmation includes the AAV (or other suitable information) received from the issuer 104 in connection with performing the enhanced authentication of the consumer 102 and/or the consumer's payment account.

However, when the issuer 104 determines that the consumer 102 is ineligible for the authentication assertion (at 310), the issuer 104 instead provides an instruction to the directory server 112, at 318, indicating that no assertion is available for the consumer 102 and to seek conventional authentication of the consumer 102 and/or the consumer's payment account (as indicated below line AA in FIG. 3). In connection therewith, the directory server 112 contacts the ACS 114, at 320, and the ACS 114 performs the authentication. For example, the ACS 114 initially verifies, at 322, enrollment of the consumer's payment account and/or the issuer 104 with the ACS 114 (for the desired authentication service). Then, when such enrollment is verified, the ACS 114 authenticates the consumer 102, at 324. In connection with the later, the ACS 114 provides a network address (e.g., a URL, etc.) back to the virtual location of the merchant 106, through the directory server 112 and the MPI 110. The merchant 106 then in turn calls the network address. This permits the ACS 114 to interact with the consumer 102, via the consumer's computing device 108, whereby the ACS 114 may solicit a personal identification number (PIN), a biometric, or other information from the consumer 102 suitable to authenticate the consumer 102 (e.g., to verify against reference data included in the ACS 114 or at the payment network 118, etc.). Upon consumer authentication, the ACS 114 responds to the MPI 110, at 326, with the confirmation (e.g., the AAV, etc.), or the ACS 114 responds to the MPI 110 with another message when the consumer authentication failed (e.g., a confirmation despite the failure, a failure indication, a not-authenticated response, etc.).

Then in the method 300, regardless of whether the authentication confirmation is provided from the issuer 104 or the ACS 114, the merchant 106 compiles an authorization request for the transaction and submits it for approval by the issuer 104, as described above in the system 100.

Optionally, as indicated below line BB in FIG. 3, the issuer 104, in determining whether the consumer is eligible for the authentication assertion (at 310), may determine that the transaction should be declined outright (without further attempts to authenticate the consumer 102 by the ACS 114). For example, a payment card used in the transaction may be associated with a payment account for which the payment card has been reported lost or stolen (broadly, based on a fraud condition), whereupon the issuer 104 may decide to decline all transactions to the payment account. Further, the issuer 104 may employ one or more risk factor to determine that the transaction should be declined, such as, for example, a factor associated with the amount of the transaction, existence of suspicious spending patterns for the payment account, velocity attacks associated with the payment account, etc. In such cases, the issuer 104 provides, at 328, a decline instruction to the directory server 112. In response, the directory server 112 provides the decline instruction for the transaction, at 330, to the MPI 110 (and the merchant 106, which may then decline the transaction with the consumer 102).

In view of the above, the systems and methods herein permit users to be authenticated to accounts based on information in the possession of issuers of the accounts (and, in various applications, independent of current transactions being performed by the users for which such authentication is requested). Specifically, issuers often employ one or more authentication techniques in connection with granting consumers access to their accounts online or via network-based applications, etc. Separately, in connection with other authentication services (e.g., involving transactions performed by the consumers, etc.), for example, the issuers engage other entities, such as ACSs, to authenticate the consumers. As can be appreciated, this often gives rise to redundant and/or unnecessary authentication of the consumers. As described herein, to alleviate such duplicity, authentication assertion requests are used to capture prior authentications by issuers, and utilize such prior authentications in the context of subsequent enhanced authentication services, rather than routing the additional authentications through corresponding ACSs as is conventional. In this manner, the conventional flow of consumer authentications is modified so that consumer friction with fraud prevention and other services may be reduced, while still providing the services underlying the further authentications. As can be appreciated, this may allow for, and actually provide, increased efficiencies in or of payment networks and/or other systems involved and, thereby, more prompt authentications of the consumers (but without sacrificing security).

Again, and as previously described, it should be appreciated that the functions described herein, in some embodiments, may be described in computer executable instructions stored on a computer-readable media, and executable by one or more processors. The computer-readable media is a non-transitory computer-readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving, at a directory server, an authentication request associated with a transaction from a merchant server plug-in (MPI), the authentication request including a payment account credential associated with the account; (b) transmitting, by the directory server, an authentication assertion request to an entity associated with the account other than an access control server (ACS) associated with an issuer of the account; (c) providing, by the directory server, an authentication confirmation to the MPI, in response to the authentication request, when the entity associated with the account provides an authentication assertion for the transaction based on a prior authentication of the user, whereby the transaction is permitted to proceed based on the authentication confirmation and without an authentication specific to the transaction; (d) seeking authentication of the user, based on the authentication request, from the ACS, when the entity provides an instruction to seek authentication of the user or fails to respond to the authentication assertion request; (e) receiving, at a computing device, an authentication assertion request, from a directory server, the authentication assertion request associated with an account of a consumer and enrolled in an enhanced authentication service; (f) determining whether the consumer is eligible for the authentication assertion based, at least in part, on a prior authentication of the consumer; (g) providing an authentication assertion for the transaction to the directory server when the consumer is eligible for the authentication assertion, whereby the transaction, directed to the account enrolled in the enhanced authentication service, is permitted without an authentication specific to the transaction; and (h) providing an indication to seek authentication of the consumer, when the consumer is ineligible for the authentication assertion.

Exemplary embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for use in authenticating a user to an account in connection with a network transaction, the system comprising:
 a directory server coupled in communication with a merchant server plug-in (MPI) associated with a merchant and in communication with an issuer of an account associated with the user, the issuer separate from an access control server (ACS) associated with the issuer;
 wherein the directory server is configured to:
  receive an authentication request, from the MPI, associated with a transaction between the user and the merchant, the authentication request including a payment account credential associated with the account;
transmit an authentication assertion request to the issuer of the account;
in response to an authentication assertion from the issuer, which is responsive to the authentication assertion request, transmit an authentication confirmation to the MPI, thereby omitting the ACS associated with said issuer from participating in the authentication confirmation, the authentication assertion based on, at least in part, an authentication of the user before the authentication assertion request is received; and
in the absence of an authentication request from the issuer, responsive to the authentication assertion request, seek authentication of the user, from the ACS.

2. The system of claim 1, wherein the authentication assertion request includes the authentication request;
wherein the authentication assertion includes an accountholder authentication value (AAV); and
wherein the authentication confirmation includes the AAV from the authentication assertion.

3. The system of claim 1, wherein the directory server is configured to transmit the authentication assertion request to the issuer of the account, in response to at least one condition associated with the transaction and/or the account being satisfied; and
wherein the directory server is further configured to seek authentication of the user, based on the authentication request, from the ACS, in response to the at least one condition associated with the transaction and/or the account not being satisfied.

4. The system of claim 3, wherein the at least one condition is based on an amount of the transaction and/or a merchant involved in the transaction.

5. The system of claim 1, further comprising the issuer in communication with the directory server; and
wherein the issuer is configured to:
determine whether the user is eligible for the authentication assertion, based, at least in part, on a prior authentication of the user; and
provide the authentication assertion, in response to the authentication assertion request, in response to the user being eligible for the authentication assertion.

6. The system of claim 5, wherein the issuer is configured to determine that the user is eligible for the authentication assertion based on at least one of a type of the prior authentication and/or a time of the prior authentication being within a defined interval.

7. The system of claim 6, wherein the issuer is configured to determine whether the user is eligible for the authentication assertion further based on a merchant of the transaction and/or an amount of the transaction.

8. The system of claim 5, wherein the issuer is configured to provide a decline instruction, in response to the authentication assertion request, in response to the account being associated with a fraud condition.

9. The system of claim 1, wherein the authentication assertion request includes an AAV including an encrypted value, but not personal identifying information (PII) of the user.

10. A method for use in authenticating a user associated with an account, in connection with a transaction involving the account, the method comprising:
receiving, at a directory server, an authentication request associated with a transaction from a merchant server plug-in (MPI), the authentication request including a payment account credential associated with the account;
transmitting, by the directory server, an authentication assertion request to an entity associated with the account other than an access control server (ACS) associated with an issuer of the account; and then
in response to an authentication assertion, from the entity associated with the account, based on a type of a prior authentication of a user associated with the account by the entity, providing, by the directory server, an authentication confirmation to the MPI, whereby the transaction proceeds based on the authentication confirmation and without an authentication specific to the transaction.

11. The method of claim 10, further comprising determining whether the account is enrolled in an enhanced authentication service; and
wherein transmitting the authentication assertion request to the entity includes transmitting the authentication assertion request to the entity only after the account is enrolled in the enhanced authentication service.

12. The method of claim 10, wherein transmitting the authentication assertion request to the entity includes transmitting the authentication assertion request to the entity, in response to the transaction satisfying at least one condition.

13. The method of claim 12, wherein the at least one condition is based on at least one of: a strength of the prior authentication, a type of the prior authentication, an amount of the transaction, and/or a merchant involved in the transaction.

14. The method of claim 12, wherein the entity includes one of an issuer and a government entity.

15. A method for use in authenticating a user associated with an account, in connection with a transaction involving the account, the method comprising:
receiving, at a computing device of an issuer, an authentication assertion request, from a directory server, the authentication assertion request associated with the account of the user, the user associated with an enhanced authentication service;
determining, by the computing device, whether the user is eligible for an authentication assertion based, at least in part, on a type of a prior authentication of the user by the issuer;
in response to determining that the user is eligible for the authentication assertion, providing the authentication assertion for the transaction to the directory server, whereby the transaction, directed to the account, is permitted without an authentication specific to the transaction via an access control server (ACS) associated with the issuer;
receiving, at the computing device of the issuer, an authorization request for the transaction, the authorization request including the authentication assertion; and
approving, by the computing device of the issuer, the transaction based at least in part on the authentication assertion included in the authorization request.

16. The method of claim 15, wherein determining whether the user is eligible for the authentication assertion is further based whether the prior authentication is within a defined interval of the transaction.

17. The method of claim 15, wherein the authentication assertion includes an accountholder authentication value (AAV) specific to the transaction, but is devoid of personal identifying information (PII) of the user.

18. The method if claim 17, wherein determining whether the user is eligible for the authentication assertion is further based on at least one of: an amount of the transaction and/or a merchant involved in the transaction.

19. The method if claim 17, wherein determining whether the user is eligible for the authentication assertion includes determining the user is eligible for the authentication assertion based, at least in part, on the type of authentication of a prior transaction being a biometric authentication.

* * * * *